Jan. 28, 1969
G. M. RAPATA
3,424,004
LIQUID LEVEL INDICATOR
Filed Feb. 21, 1966
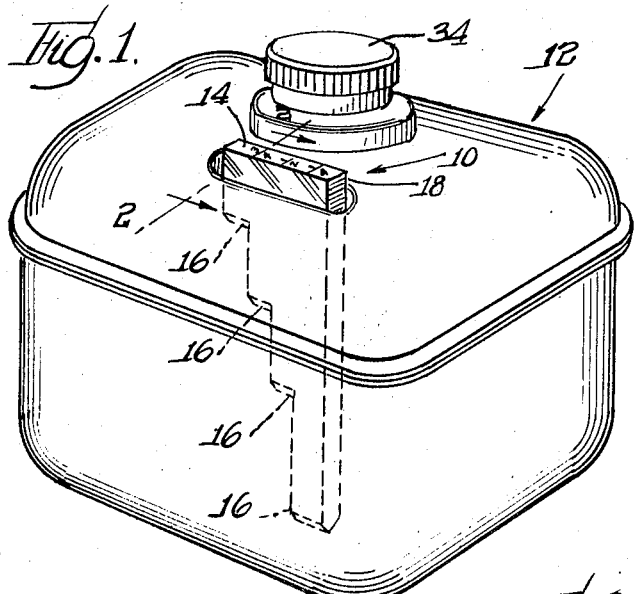
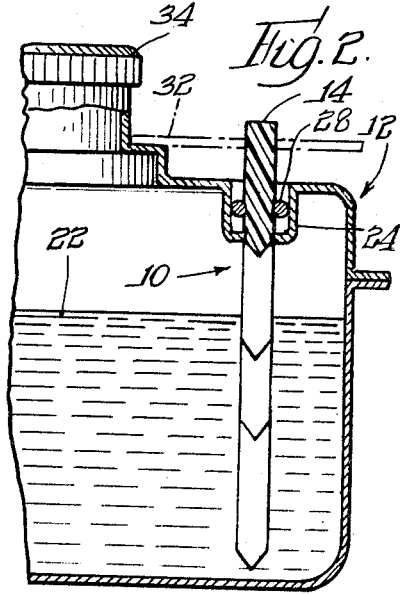
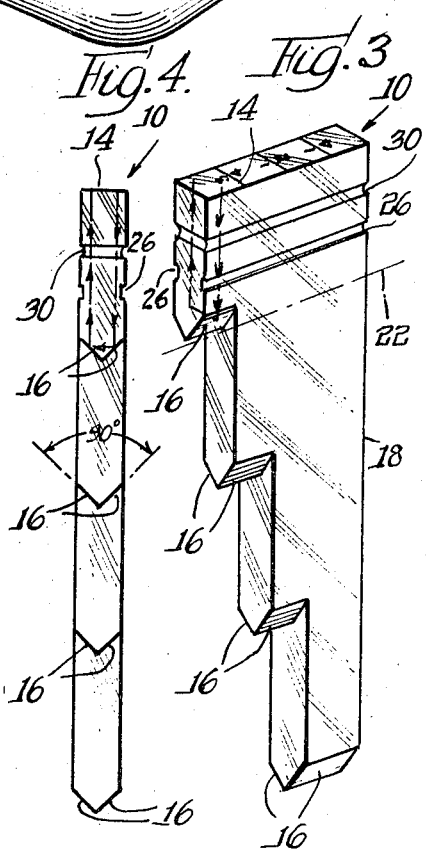
Inventor
George M. Rapata
By: Olson, Trexler, Wolters & Bushnell
attys.

Jan. 28, 1969
G. M. RAPATA
3,424,004
LIQUID LEVEL INDICATOR
Filed Feb. 21, 1966
Sheet 2 of 2
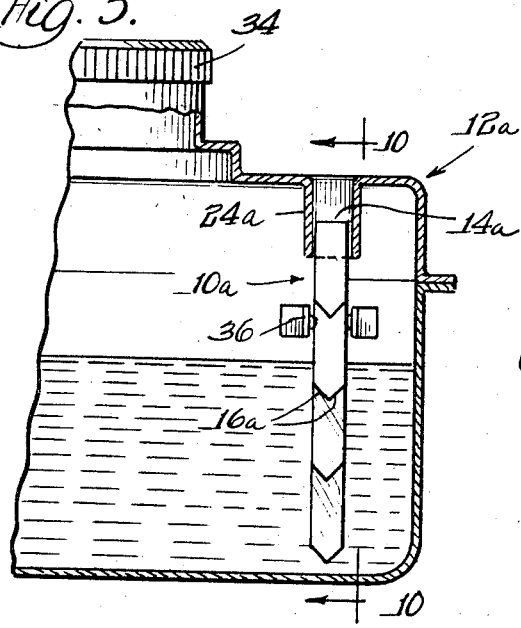
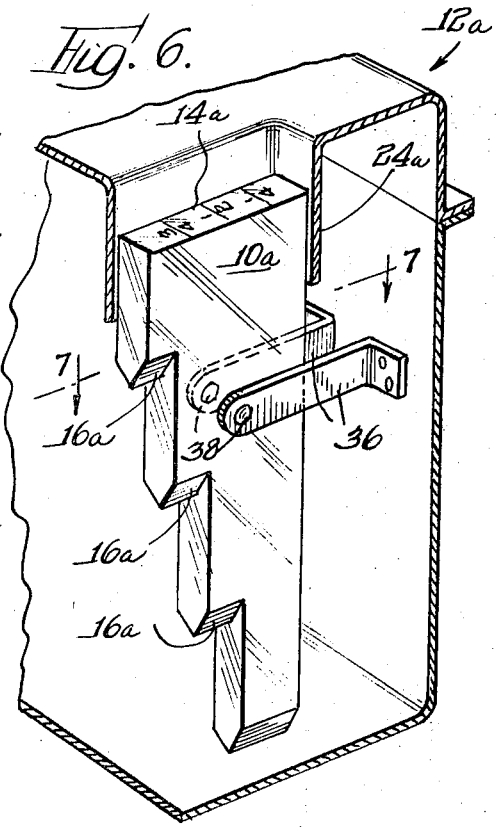
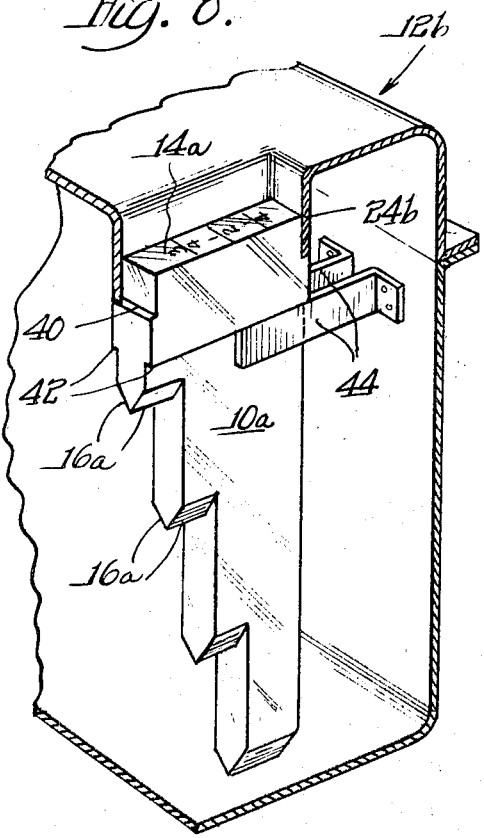
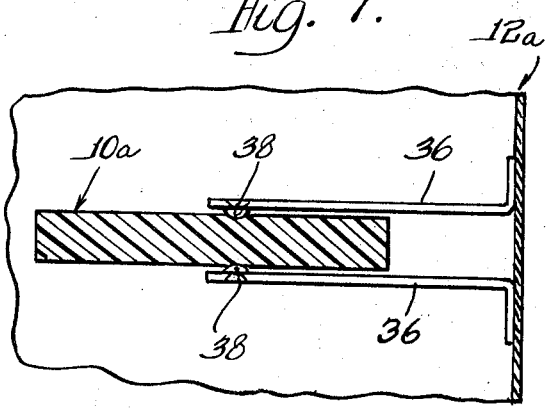
Inventor
George M. Rapata
By: Olson, Trexler, Wolters & Bushnell
attys.

United States Patent Office 3,424,004
Patented Jan. 28, 1969

3,424,004
LIQUID LEVEL INDICATOR
George M. Rapata, Park Ridge, Ill., assignor to Illinois Tool Works Inc., Chicago, Ill., a corporation of Delaware
Filed Feb. 21, 1966, Ser. No. 529,066
U.S. Cl. 73—327        7 Claims
Int. Cl. G01f 23/02

ABSTRACT OF THE DISCLOSURE

There is disclosed a liquid level indicator assembled with a tank or container. The indicator is constructed from a transparent material and has an upper light receiving edge and light reflective edge surface means depending therefrom and comprising a plurality of V-shaped vertically spaced surfaces in the form of steps comprising pairs of surfaces disposed at 90° with respect to each other.

---

This invention relates generally to liquid level indicators and more particularly to indicators of the light transmitting type adapted for use with containers designed to completely enclose a liquid body of substantial height.

The present invention contemplates a light transmitting liquid level indicator as set forth above which may depend from the wall of a container into a body of liquid, the height of which will fluctuate between low and relatively high levels.

It is a further object to provide a level indicator of the type set forth above which is relatively small in size, simple in construction, and efficiently operable to indicate infinite degrees of liquid levels over a relatively wide range.

To accomplish the above-mentioned objects and advantages, the invention contemplates the use of light transmitting and reflective material of new and novel geometric design.

The foregoing and other objects and advantages will be more apparent from the following detailed description, when considered in connection with the accompanying drawing, wherein:

FIG. 1 is a perspective view of a container adapted to completely enclose a liquid body of substantial height, said container having in operative association therewith a liquid level indicator embodying features of the present invention;

FIG. 2 is a fragmentary sectional view of the container taken substantially along the line 2—2 of FIG. 1;

FIG. 3 is a detailed perspective view of the level indicating member supported by the container shown in FIGS. 1 and 2;

FIG. 4 is an elevational view from the left of FIG. 3;

FIG. 5 is a fragmentary sectional view similar to FIG. 2, disclosing a modified arrangement for mounting a plate-like indicator member in a liquid container;

FIG. 6 is a fragmentary perspective view of the indicator supporting arrangement of FIG. 5, more clearly to illustrate the structural details thereof;

FIG. 7 is a horizontal sectional view taken substantially along the line 7—7 of FIG. 6; and FIG. 8 is a fragmentary perspective view similar to FIG. 5, disclosing a modified indicator supporting arrangement.

Referring now to the drawing more in detail, wherein like numerals have been employed to designate similar parts throughout the various views, it will be seen that for the purpose of illustrating one practical application of the present invention a liquid level indicating member of the type contemplated hereby is designated generally by the numeral 10, and is shown in operative association with a container or gasoline tank 12. The tank 12 is of the type adapted to completely enclose a liquid body of substantial height, as compared with relatively shallow type liquid containers. The plate-like member 10 is formed from suitable light transmitting materials, such as certain types of plastic and glass. Plastic material is preferable to glass in view of its resistance to breakage.

An upper edge surface 14 of the member 10 is adapted to be positioned externally of or substantially flush with the container 12 as shown in FIGS. 1 and 2, so as to be exposed to a source of light. Indicia provided along this upper edge surface 14 indicate various levels of liquid, such as one-quarter, one-half, three-quarters, etc. Indicia may also be placed or engraved below the upper edge surface 14 in such a position as to permit the reflection thereof on said upper edge surface. It will be clear from the directional arrows and dotted lines associated therewith, that light is received by the edge surface 14 and directed downwardly to a series of surfaces 16 arranged in pairs intersecting along a line which is parallel to surface 14, the surfaces 16 of each pair being disposed at 90° with respect to each other. In the aggregate, these surfaces 16 provide what might be correctly referred to as an arrangement of light reflective edge surface means extending downwardly from adjacent one extremity of the edge surface 14 in approaching relation with respect to the lower extremity of a vertical edge surface means 18. Depending upon the level of the liquid within the container 12, one of the pairs of surfaces 16 will reflect light from one to the other and back through surface 14. Assuming light rays follow the dotted lines indicated by the directional arrows in FIG. 3, from the surface 14 to one surface 16 and thence to the adjacent surface 16 and thence upwardly to the edge surface 14. The portion of the surface 14 receiving this reflected light will be illuminated so as to indicate the area within the container which is not occupied by liquid.

In FIGS. 2 and 3 the liquid level is indicated by dot-and-dash line 22. At this level, the container 12 is substantially three-quarters full, and therefore that portion of the surface 14 positioned to the left of the three-quarter mark will be illuminated, whereas the remainder of the surface will not be illuminated. In other words, that portion of the member 10 which is immersed within the liquid container 12 prevents light received by the exposed edge surface 14 from being reflected to said surface.

As shown in FIG. 2, the indicator member 10 is mounted within a depressed section 24 of the container 12. Longitudinal grooves 26 provided along opposite sides of the member 10 are designed to interlock with the flange portions of the depressed section 24. To prevent liquid in the container 12 from splashing externally, a suitable resilient sealing element or ring 28 is provided which encircles the member 10, and is wedged between said member and the adjacent walls of the section 24. The sealing ring 28 is lodged within an optional complementary groove 30 which encircles or partially encircles the member 10. A suitable guard member, indicated by dot-and-dash lines 32 of FIG. 2, may be positioned in superimposed relation with respect to the member 10 to counteract the accumulation of foreign matter, such as dust and dirt, in that vicinity. The container 12 is provided with a detachable closure member or cap 34 to facilitate filling the container with liquid.

In some instances it may be advantageous to so mount the indicator member on the container that the upper light receiving edge surface thereof is substantially flush with or below the upper surface or wall of the container. This is particularly important in instances where the external light is so bright as to make it difficult for a user to observe the level indicating reflections on the upper edge surface. In such instances, it may be desirable to locate the upper edge surface of the level indicator member in a container well or recess. Thus in FIGS. 5, 6 and 7, the plate-like liquid level indicator 10a which is essentially identical to the above described indicator 10 except for the manner of mounting is positioned so that its upper light receiving edge surface 14a is positioned below the upper wall of a container 12a within a well provided by a depressed section 24a. This affords suffficient interception of external light rays to render the level indicating indicia more readily readable by the user. The indicator member 10a is maintained in its proper position by means of bracket arms 36 supported by the side wall of the container 12a. The free extremities of the bracket arms 36 are provided with detents 38 which are adapted to register with complementary recesses in the side wall of the member 10a. The light reflecting surfaces 16a function in the manner previously described. As heretofore stated, the level indicating indicia may either be etched or otherwise formed on the upper light receiving edge surface 14a or upon the reflecting surfaces 16a. If provided on the surfaces 16a, the indicia may be reflected onto the surface 14a.

In FIG. 8 a slightly modified arrangement for supporting the member 10a within a container 12b is shown. Shoulders 40 on the member 10a are adapted to snap into position beneath the lower edges of the depressed section 24b. Shoulders 42 of the member 10a, are adapted to rest upon the upper edges of bracket arms 44 extending inwardly from an secured to the vertical wall of the container 12b. In this manner the upper light receiving edge surface of the member 10a is located within a well in a predetermined position beneath the upper portion of the container.

From the foregoing, it will be apparent that all forms of the liquid level indicator members herein decribed are adapted to receive light on an upper exposed surface edge and this light is directed downwardly and reflected back to the light receiving surface as and for the purpose previously described. In all forms, the area of the light receiving surface edge which is illuminated, indicates that portion of the container which is not occupied by liquid. The remaining unilluminated portion of the light receiving edge surface indicates the extent or degree of height occupied by the liquid in the container. It will be apparent from the foregoing description that the portion of the upper surface edge 14 which receives light reflected from the surfaces 16 will be determined by the extent to which the plate member 10 is immersed within the liquid of the container. Also, each pair of surfaces 16 will receive light from and reflect light to a restricted portion of the upper edge surface 14, such restriction being limited to the horizontal length of the surfaces 16. Thus the surfaces 16 at the bottom of the plate member 10 will receive light from and reflect light to only the right extremity of the surface 14, whereas the pair of surfaces 16 positioned toward the upper extremity of the plate 10, will only receive light from and reflect light to the left extremity of the surface 14. Another way of stating this relationship is that each pair of surfaces 16 receives light from and reflects light to complementary portions or areas of the upper light receiving edge surface 14. Particular attention is directed to the fact that by having a series of light reflecting surfaces, such as the surfaces 16 of FIG. 3, and 16a of FIGS. 5–8; the members 10, and 10a may be of substantial length without increasing the overall length of the light receiving edge surfaces at the upper end of each member. In other words, the liquid level indicating member of the present invention is particularly adaptable for use with rather deep, as distinguished from shallow containers. Thus the use of the series of vertically spaced light reflecting surfaces 16 in the form of steps, makes it possible to indicate with accuracy the fluctuating levels of liquid within the container of substantial height, without substantially increasing the overall size of the light transmitting level indicator. It will be apparent that the invention contemplates liquid indicators of extremely simple construction which are relatively inexpensive and yet very efficiently operable for their intended purpose. Obviously the light transmitting liquid level indicator members contemplated by the present invention are applicable for use in a wide variety of liquids as well as containers differing from the specific disclosures herein described.

While specific structural forms of light transmitting liquid level indicators have been disclosed in the drawing, it should be understood that the present invention contemplates other modifications and changes.

The invention is claimed as follows:

1. A level indicator for indicating levels of liquid subject to fluctuation, including a plate-like light transmitting member having an upper light receiving edge surface means, edge means depending from one extremity of said upper light receiving edge surface means, and light reflective edge surface means depending from the opposite extremity of said upper light receiving edge means including a plurality of pairs of immersible, vertically spaced apart, reflective surfaces of limited horizontal extent positioned beneath complementary portions of said upper light receiving edge surface means and extending horizontally from one end of said light reflective edge surface means in a direction toward said edge means, said pairs of reflecting surfaces being progressively offset horizontally from top to bottom of said plate-like member with the lowermost pair positioned closest to said depending edge, the light reflective surfaces of each of said pairs angularly extending downwardly and intersecting in a line parallel to said upper light receiving edge surface means, said lines of intersection also being parallel to each other and positioned within a common plane which is parallel to the side surfaces of the plate-like member, said pairs being so positioned as to receive light from and reflect said light to said upper light receiving edge surface means only when said light reflective surfaces are free from contact with the body of liquid with which the indicator is adapted to be used.

2. A level indicator for indicating levels of liquid subject to fluctuation as set forth in claim 1 wherein the vertically spaced apart reflective surfaces of the light reflective edge surface means are disposed at forty-five degrees with respect to the upper edge surface means.

3. A level indicator for indicating levels of liquid subject to fluctuation as set forth in claim 1 wherein the upper portion of said plate-like member is provided with means for accommodating a wall portion of a liquid container.

4. A level indicator for indicating levels of liquid subject to fluctuation as set forth in claim 1 wherein each pair of said vertically spaced apart reflective surfaces comprise surfaces disposed at ninety degrees with respect to each other inclined approximately forty-five degrees with respect to the plane of said plate-like member.

5. A level indicator for indicating levels of liquid subject to fluctuation as set forth in claim 1 wherein the vertical dimension of the plate-like light transmitting member is greater than the longitudinal horizontal dimension of the upper light receiving edge surface means.

6. A level indicator for indicating levels of liquid subject to fluctuation as set forth in claim 1, wherein the upper portion of the plate-like light transmitting member is provided with shoulder means for mounting said plate-like member in a container for liquids.

7. In combination with a container for enclosing a liquid body, a level indicator for indicating levels of liquid subject to fluctuation, including a plate-like light transmitting member having an upper light receiving edge surface means, edge means depending from one extremity of said upper light receiving edge surface means, and light reflecting edge surface means depending from the opposite extremity of said upper light receiving edge means including a plurality of pairs of immersible, vertically spaced apart, reflective surfaces of limited horizontal extent positioned beneath complementary portions of said upper light receiving edge surface means and extending horizontally from one end of said light reflective edge surface means in a direction toward said edge means, said pairs of reflective surfaces being progressively offset horizontally from top to bottom of said plate-like member with the lowermost pair positioned closest to said depending edge, the light reflective surfaces of each of said pairs angularly extending downwardly and intersecting in a line parallel to said upper light receiving edge surface means, said lines of intersection also being parallel to each other and positioned within a common plane which is parallel to the side surfaces of the plate-like member, said pairs being so positioned as to receive light from and reflect said light to said upper light receiving edge surface means only when said light reflective surfaces are free from contact with the body of liquid with which the indicator is adapted to be used, and means extending from a side wall of the container for supporting the level indicator within the container and including detents which are adapted to be received by recesses in the light transmitting member.

References Cited

UNITED STATES PATENTS

| | | | |
|---|---|---|---|
| 1,724,716 | 8/1929 | Kryzanowsky | 73—293 |
| 1,883,971 | 10/1932 | Kryzanowsky | 73—327 |
| 2,615,337 | 10/1952 | Maybach | 73—327 |
| 3,273,267 | 9/1966 | Willman | 73—327 X |
| 2,767,754 | 10/1956 | Lederer et al. | |
| 3,120,125 | 3/1968 | Vasel | 73—293 |
| 3,362,224 | 1/1968 | Melone | 73—327 |

FOREIGN PATENTS

| | | |
|---|---|---|
| 490,441 | 2/1953 | Canada. |
| 412,803 | 7/1934 | Great Britain. |
| 672,539 | 5/1952 | Great Britain. |

LOUIS R. PRINCE, *Primary Examiner.*

D. M. YASACH, *Assistant Examiner.*

U.S. Cl. X.R.

88—14